(12) United States Patent
Logan

(10) Patent No.: US 7,846,590 B2
(45) Date of Patent: Dec. 7, 2010

(54) FUEL CELL SYSTEM CATHODE INLET RELATIVE HUMIDITY CONTROL

(75) Inventor: Victor W. Logan, Naples, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 145 days.

(21) Appl. No.: 12/019,654

(22) Filed: Jan. 25, 2008

(65) Prior Publication Data

US 2009/0191432 A1 Jul. 30, 2009

(51) Int. Cl.
*H01M 8/22* (2006.01)
(52) U.S. Cl. ..................................... 429/413
(58) Field of Classification Search ........................ None
See application file for complete search history.

(56) References Cited

U.S. PATENT DOCUMENTS 5,771,476 A * 6/1998 Mufford et al. ............... 701/22
2004/0142218 A1 * 7/2004 Kusano et al. ................ 429/13
2006/0147773 A1 * 7/2006 Steinshnider et al. ......... 429/26
2006/0263651 A1 * 11/2006 Fagley et al. .................. 429/13
2006/0263652 A1 * 11/2006 Logan .......................... 429/13

OTHER PUBLICATIONS

Khan et al, dynamic modeling and simulation of a small wind fuel cell hybrid energy system, 2005, renewable energy, ed. 30, pp. 421-439.*
AVR221: discrete PID controller, 2006, ATMEL.*

* cited by examiner

*Primary Examiner*—Melvin C Mayes
*Assistant Examiner*—Stefanie Cohen

(57) ABSTRACT

A fuel cell system (100) and operational methods (200, 300 and 400) are described that utilize a combination of sensor input and component models for causing the system's cathode effluent (150) to selectively bypass cathode effluent processing components (140) so as to obtain or maintain a desired cathode inlet relative humidity or dew point. The described system and methods may operate open loop (e.g., without sensor feedback to verify operation) or closed loop (e.g., relying on cathode inlet relative humidity/dew point sensors or fuel cell stack membrane conductivity measures).

21 Claims, 4 Drawing Sheets

FUEL CELL SYSTEM CATHODE INLET RELATIVE HUMIDITY CONTROL

BACKGROUND

The present invention relates a system and method for operating a fuel cell system and, more particularly, to a system and method for controlling the relative humidity or dew point of a fuel cell system's cathode inflow.

Fuel cells are used as a power source for electric vehicles, stationary power supplies and other applications. One known fuel cell is the Proton Exchange Membrane ("PEM") fuel cell that includes a plurality of membrane-electrode-assemblies ("MEAs"). A MEA comprises a thin, solid polymer membrane-electrolyte having an anode on one face and a cathode on the opposite face and is sandwiched between a pair of electrically conductive contact elements which serve as current collectors for the anode and cathode. The collectors typically contain appropriate channels and openings for distributing the fuel cell's gaseous reactants (e.g., hydrogen/$H_2$ and oxygen/$O_2$) over the surfaces of the respective anode and cathode.

PEM fuel cells comprise a plurality of the MEAs in electrical series (collectively referred to as a stack) while being separated one from the next by an impermeable, electrically conductive contact element known as a bipolar plate or current collector.

The fuel cells are operated in a manner that maintains the MEAs in a humidified state. The cathode and/or anode reactant gases being supplied to the fuel cell are typically humidified to prevent drying the MEAs in the locations proximate the reactant gases inlets. The level of the MEAs' humidity affects the performance of the fuel cell. Additionally, if an MEA is run too dry, the MEA can be damaged which can cause immediate failure or reduce the useful life of the fuel cell.

The operation of the fuel cells with the MEAs humidified too much, however, may also limit the fuel cell stack's performance. Specifically, the formation of liquid water can impede the diffusion of gas to the MEAs, thereby limiting their performance. Liquid water may also act as a flow blockage reducing cell flow and causing even higher fuel cell relative humidity which can lead to unstable fuel cell performance. Additionally, the formation of liquid water within a cell can cause significant damage when the fuel cell is shut down and exposed to freezing conditions. That is, when the fuel cell is non-operational and the temperature in the fuel cell drops below freezing, the liquid water therein will freeze and expand, potentially damaging the fuel cell.

SUMMARY

The invention provides a system wherein cathode effluent is selectively shunted around a water vapor transfer device (WVTD) so as to maintain the system's cathode inlet relative humidity (or dew point) at, or substantially at, a specified/target relative humidity (or dew point). In one embodiment measured cathode inlet relative humidity (or dew point) may be used to control the amount of cathode effluent shunted around the WVTD. In another embodiment, fuel cell stack membrane conductivity may be used to control the amount of cathode effluent shunted around the WVTD. In still another embodiment, cathode effluent may be shunted without recourse or reliance measured relative humidity, dew point or fuel cell membrane conductivity. In this latter approach, the specified operational parameter (e.g., cathode inlet relative humidity or dew point) is said to be controlled in an open loop fashion.

In other embodiments, a fuel cell system may be controlled in accordance with a method that manipulates a WVTD bypass valve so as to maintain the system's cathode inlet relative humidity (or dew point). Methods in accordance with the invention may be implemented, in part, by a controller that executes program instructions. Such instructions may be stored in any media that is readable and executable by the controller.

DETAILED DESCRIPTION

The following description is presented to enable any person skilled in the art to make and use the invention as claimed and is provided in the context of the particular examples discussed below, variations of which will be readily apparent to those skilled in the art. More specifically, illustrative embodiments of the invention are described in terms of fuel cell stacks that use gaseous hydrogen ($H_2$) as a fuel, gaseous oxygen ($O_2$) as an oxidant in the form of air (a mixture of $O_2$ and nitrogen, $N_2$) and proton exchange or polymer electrolyte membrane ("PEM") electrode assemblies ("MEAs"). The claims appended hereto, however, are not intended to be limited by the disclosed embodiments, but are to be accorded their widest scope consistent with the principles and features disclosed herein.

In general, a fuel cell stack operated in accordance with the invention uses a combination of sensor input and component models to controllably bypass cathode effluent processing components to maintain the stack's cathode inlet relative humidity (RH). In one embodiment, fuel cell stack cathode gas inflow RH may be controlled in combination with input from a cathode gas inflow RH sensor. In another embodiment, fuel cell stack cathode gas inflow RH may be controlled in combination with a fuel cell stack membrane conductivity measurement (in lieu of a cathode gas inflow RH sensor). In still another embodiment, fuel cell stack cathode gas inflow RH may be controlled without input from either a cathode gas inflow RH sensor or a fuel cell stack membrane conductivity measurement. It will be recognized that reference herein to RH is functionally equivalent to dew point. That is, the inventive control methodology is equally applicable to fuel cell stack operations based on cathode relative humidity or dew point.

Figure 1:
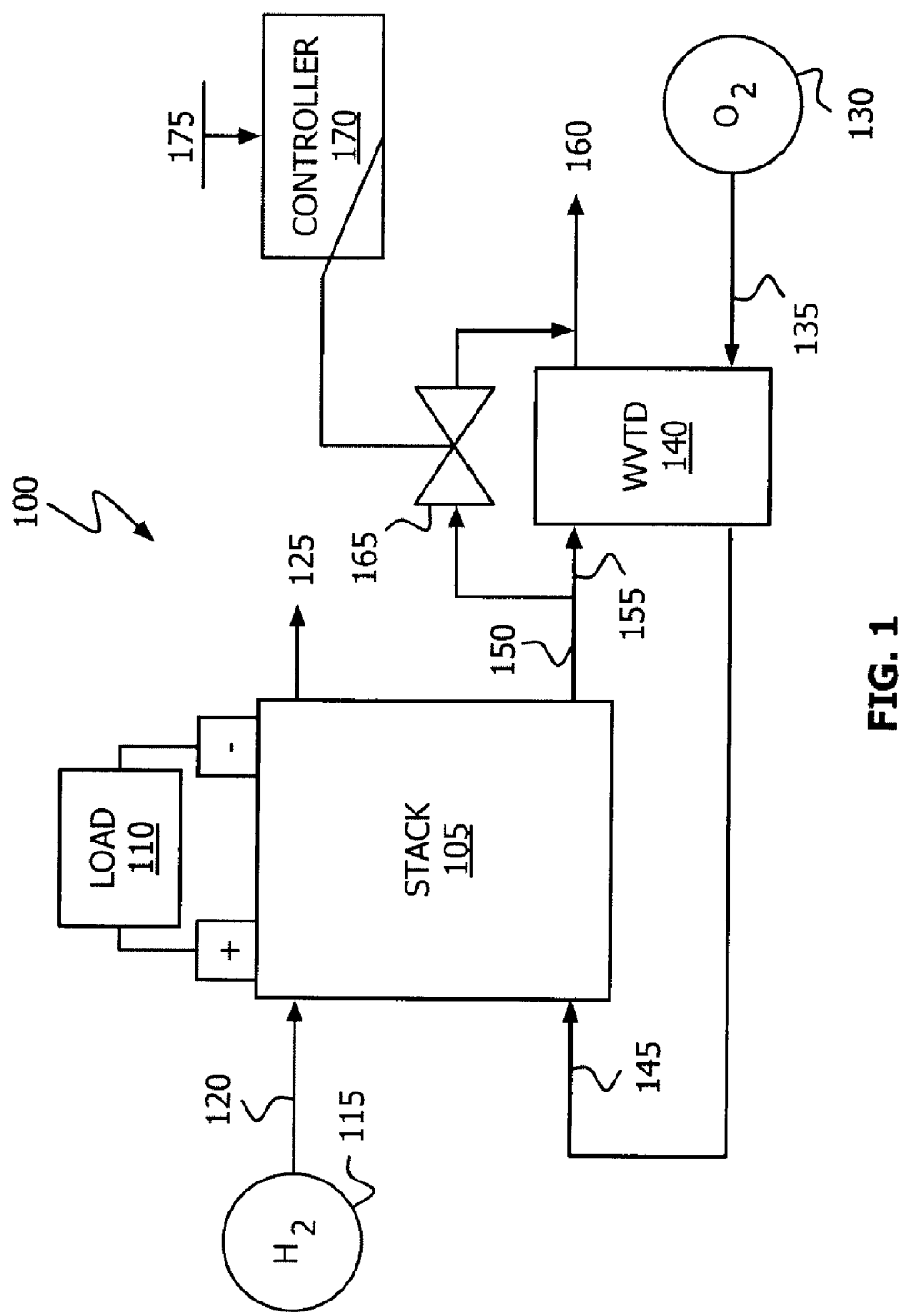
FIG. 1 shows, in block diagram form, a partial fuel cell system in accordance with one embodiment of the invention.

Referring to FIG. 1, illustrative fuel cell system 100 includes fuel cell stack 105 that, when operating, supplies power to load 110. Hydrogen supply 115 is provided to stack 105 through anode inflow line 120, with anode effluent being carried away from stack 105 through line 125. Oxygen or oxygen rich air 130 is supplied to the dry inlet port of water vapor transfer device (WVTD) 140 through line 135. Humidified oxygen rich air is supplied from the dry outlet port of WVTD 140 to stack 105 through cathode inflow line 145. Cathode effluent (via line 150) is controllably divided between WVTD 140's wet inlet port (via line 155) and WVTD 140's wet outlet port (via line 160) by WVTD bypass valve 165. Bypass valve 165 is, in turn, controlled via controller 170 which receives various sensor inputs 175 (e.g., stack current and cathode air flow). In accordance with the invention, controller 170 manipulates bypass valve 165 to control cathode inflow RH regardless of cathode inflow and/or effluent temperatures as in the prior art. In one embodiment, controller 170 may be a proportional-integral-derivative (PID) controller (continuous, discrete or fuzzy) that uses feedback from a cathode inlet relative humidity or dew point sensor. In another embodiment, controller 170 may be a PID controller (continuous, discrete or fuzzy) that uses feedback from a stack membrane conductivity sensor or measure. In yet another embodiment, controller 170 may be a controller that runs open-loop. That is, without feedback.

Figure 2:
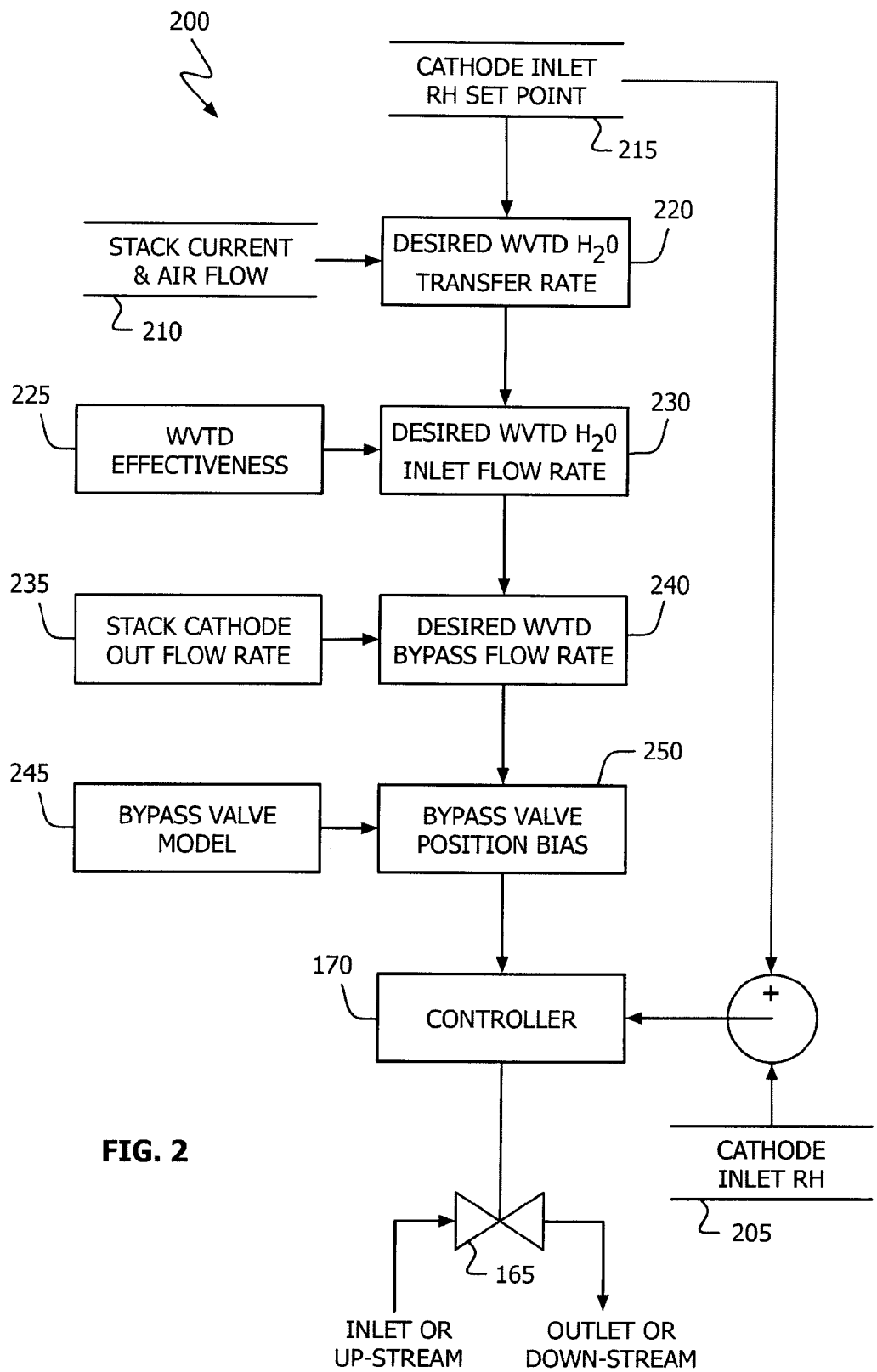
FIG. 2 shows, in flowchart form, one method in accordance with the invention to control the relative humidity of a cathode's inlet gas for a system such as that illustrated in FIG. 1.

Referring to FIG. 2, in accordance with one embodiment of the invention fuel cell system 100 may be controlled via process 200. In this embodiment, cathode inlet RH 205, stack current and cathode air flow 210 and the stack's inlet RH set point 215 are measured or provided. For example, cathode inlet RH 205 may be measured by any suitable sensor (e.g., a relative humidity or dew point sensor). Similarly, stack current and cathode air flow 210 are typically measured quantities. Cathode inlet relative humidity set point 215, on the other hand, is generally an empirically determined value based on the physical configuration of stack 105.

Using measured stack current and cathode air flow (210) and the stack's inlet RH set point (215), the desired water transfer rate across WVTD 140 may be determined (block 220). For details see APPENDIX A. It will be appreciated that the amount of water transferred across WVTD 140 is dependent upon, and controlled by, the position of bypass valve 165. This is the "variable" manipulated in accordance with the invention to maintain the cathode inflow's RH (or dew point) at a desired value. This, in turn, results in the improved operation of fuel cell system 100.

The desired WVTD transfer rate (block 220 output) and WVTD effectiveness (block 225) may be used to determine the desired WVTD inlet water flow rate (block 130). See APPENDIX B for details concerning WVTD effectiveness. Desired WVTD inlet water flow rate may be determined in accordance with APPENDIX C.

With the WVTD's water transfer rate (block 220 output), desired water inlet flow rate (block 230 output) and cathode output flow rate (block 235) known, the desired WVTD bypass flow rate may be determined (block 240). Cathode output flow rate 235 may be measured or determined in accordance with mass balance techniques as described in the commonly owned patent application entitled "Fuel Cell System Relative Humidity Control" by Victor Logan, filed on 17 May 2005, Ser. No. 11/130,806, and which is hereby incorporated in its entirety. Desired WVTD bypass flow rate 240 may be determined in accordance with Appendix D.

The desired WVTD bypass flow rate (APPENDIX D) and a model of bypass valve 165 (APPENDIX E) may be used to determine a bypass valve bias value. See Appendix F. The determined bypass valve bias value may be supplied to controller 170 that, in turn, generates a valve control signal that manipulates bypass valve 165 in accordance therewith to achieve the desired cathode inlet relative humidity. In one embodiment, controller 170 uses the determined bypass valve bias value (block 250) to retrieve a valve position value from a table. In another embodiment, controller 170 uses the bypass valve bias value to dynamically compute a bypass valve position signal. In either case, controller 170 uses the bypass valve bias value to generate a signal to control the position of bypass valve 165. As a result, the amount of fluid bypassing WVTD 140 is controlled and, as a consequence, the desired cathode inlet RH is achieved.

Figure 3:
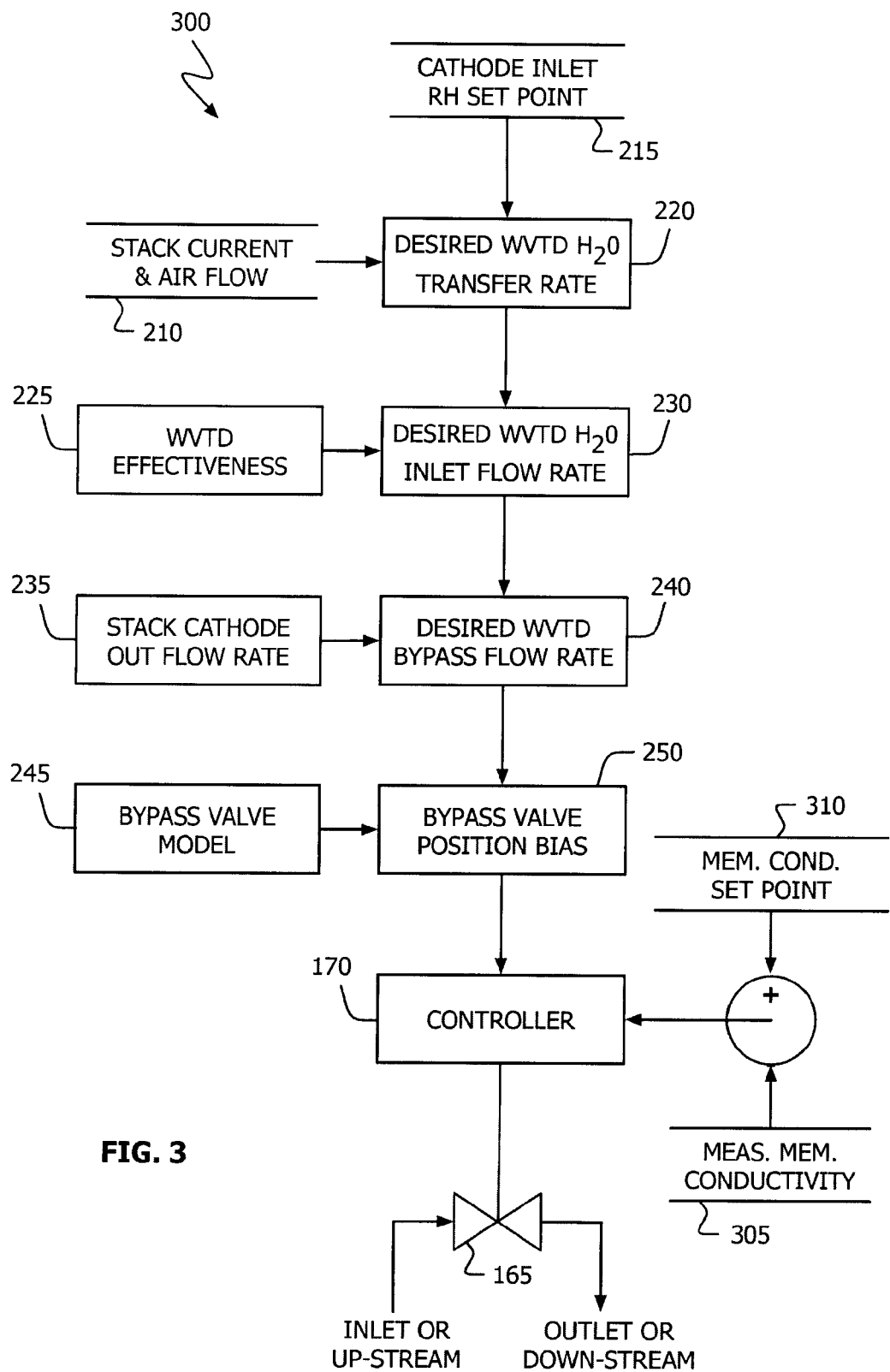
FIG. 3 shows, in flowchart form, another method in accordance with the invention to control the relative humidity of a cathode's inlet gas for a system such as that illustrated in FIG. 1.

Referring to FIG. 3, in another embodiment of the invention, fuel cell system 100 may be operated in accordance with process 300. Here, fuel cell membrane conductivity is measured 305 and compared to membrane conductivity set point 310. The difference between these two quantities is provided to controller 170 in the same manner as was the difference between measured cathode inlet RH 205 and cathode inlet RH set point 215 in process 200 (FIG. 2). In one embodiment, fuel cell membrane conductivity may be measured by sending a perturbing frequency (e.g., 1 KHz) current through the stack and measuring its resistance. This process may be done periodically or continuously. Similarly to the cathode inlet RH set point, membrane conductivity set point is determined empirically and depends, inter alia, upon the stack 105's physical construction.

Figure 4:
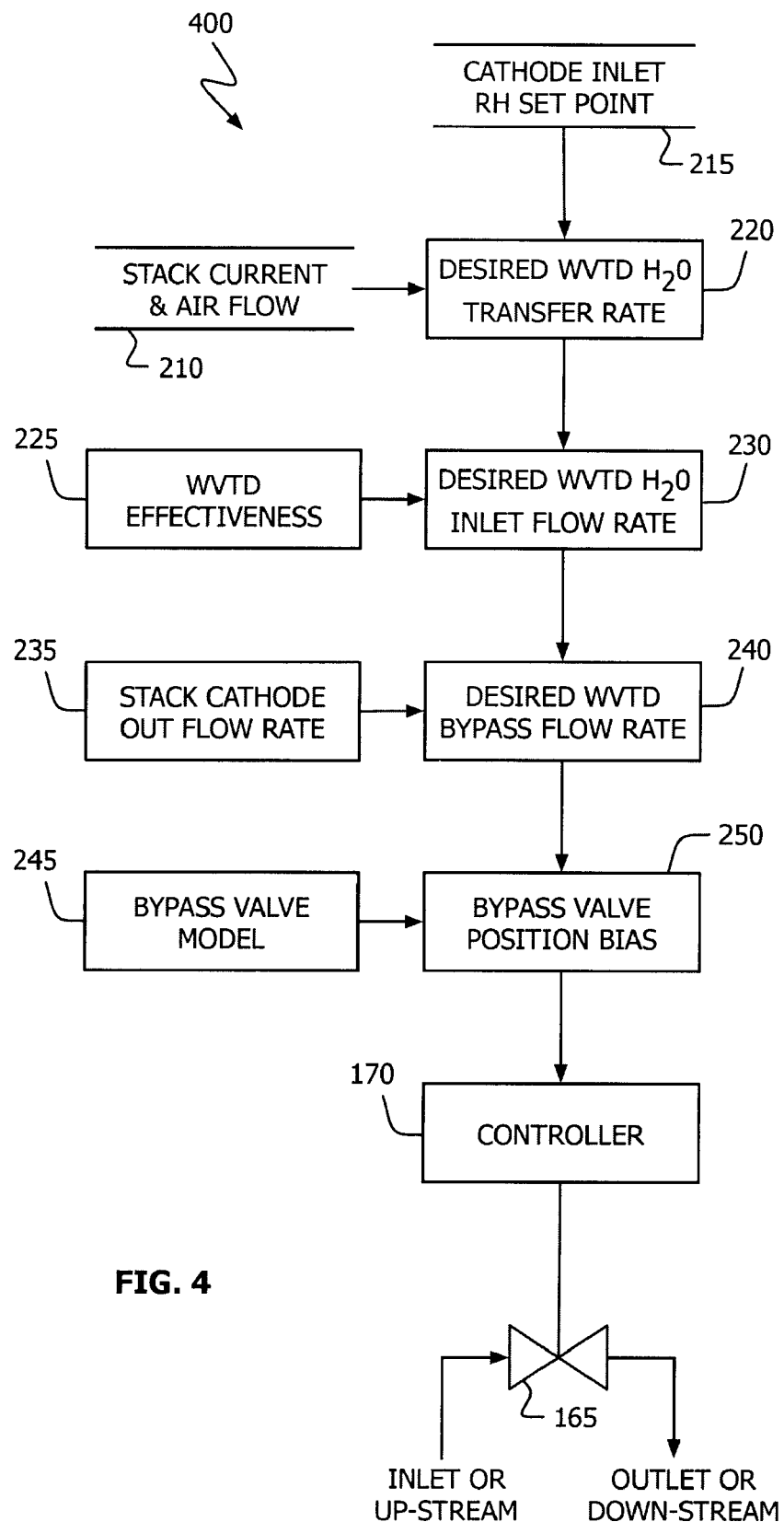
FIG. 4 shows, in flowchart form, still another method in accordance with the invention to control the relative humidity of a cathode's inlet gas for a system such as that illustrated in FIG. 1.

Referring to FIG. 4, in yet another embodiment of the invention, fuel cell system 100 may be controlled via open-loop process 400. In this embodiment, no cathode inlet RH (or dew point) or stack membrane conductivity measurement is available on which to form a closed loop control system. While the operational behavior of open loop control process 400 may result in less stability or wider excursions from the desired cathode inlet RH than closed loop control methodologies 200 and 300, it is never the less a viable technique to control cathode inlet RH.

As described herein, processes 200, 300 and 400 rely upon a combination of sensor input and component models to manipulate valve 165 so that cathode effluent from stack 105 selectively bypasses WVTD 140. Bypass valve 165 is manipulated in this manner so as to obtain or maintain a desired cathode inlet RH or dew point. It will be recognized that during the operation of fuel cell system 100, environmental fluctuations (e.g., changes in ambient pressure, temperature and humidity), operational fluctuations (e.g., changes in load demand), sensor vagaries and the like may cause the cathode inlet RH to vary so that at any given time the actual cathode inlet RH may differ from the desired cathode inlet RH. As a consequence, controller 170 may only achieve substantial coincidence between the desired and actual cathode inlet RH. As used herein, the term "substantial" means that the actual cathode inlet RH and the desired cathode inlet RH are close enough that one of ordinary skill in the art would consider fuel cell system 100 as operating at the desired cathode inlet RH.

Various changes in the materials and components as well as in the details of the illustrated operational methods are possible without departing from the scope of the following claims. For example, the illustrative fuel cell system of FIG. 100 may include additional components such anode flow path processing components, additional sensors and a coolant subsystem. In addition, the various parameters used by each of processes 200, 300 and 400 may be obtained, determined or computed in any manner desired by the designer. For instance, controller 170 may be implemented as a hardware device in accordance with conventional control design principles. Controller 170 may also be implemented to include a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

APPENDIX A. Let the desired water transfer rate across WVTD 140 be represented by $n'_{H_2O\text{-}desired}$ (where the notation x' represents the time derivative of x). Then, given a desired or target cathode inlet relative humidity or dew point, the desired rate of water transfer across WVTD 140—that is, the water transfer rate from the WVTD's wet inlet port (i.e., line 155) into the WVTD's dry inlet port (i.e., line 135) which is then routed to stack 105's cathode inlet (i.e., line 145)—is given by:

$$n'_{H_2O\text{-}desired} = \frac{\frac{P_{sat}}{P_{tot}} n'_{dry\text{-}in}}{1 - \frac{P_{sat}}{P_{tot}}}. \qquad \text{EQ. A1}$$

Here: $P_{tot}$ represents the measured pressure at the stack's cathode inlet (due to the combined partial pressures of the inlet air's oxygen, nitrogen and "other" gases); $P_{sat}$ represents the saturation pressure associated with the desired stack RH set point 215, a value easily determined from the stack's RH (or dew point) set point 215; and $n'_{dry\text{-}in}$ represents the measured molar flow rate of the dry gas coming into the WVTD's dry inlet port (e.g., from oxygen rich supply 130 via line 135).

APPENDIX B. WVTD effectiveness ($\epsilon$) is generally defined as:

$$\varepsilon = \frac{\text{Water Transferred into Dry Stream}}{\text{Water in Wet Stream}}. \qquad \text{EQ. B1}$$

Here: "Water in Wet Stream" is the wet feed stream's mass flow rate into WVTD 140's wet inlet port (via line 155); the "Water Transferred into Dry Stream" is the mass flow rate of the water transferred into WVTD 140's dry feed stream (via line 135) from WVTD 140's wet inlet feed stream (via line 155) into WVTD 140's dry side outlet feed stream (i.e., the WVTD's dry outlet port, via line 145).

Letting: $C_{min}$ represent the ability to bring water into the wet side of WVTD 140 (i.e., the dry mass flow rate into WVTD 140's dry inlet port via line 155); $C_{max}$ represent the ability to carry water out the dry side of WVTD 140 (i.e., the dry mass flow rate through WVTD 140 from line 135 to line 145); A represents the water transfer area of WVTD 140 (a quantity that is fixed and known for a given WVTD); and U represent the mass transfer coefficient for WVTD 140 (proportional to WVTD 140's permeability)—the number of WVTD transfer units is give by:

$$N_{tu} = \frac{AU}{C_{min}}. \qquad \text{EQ. B2}$$

WVTD effectiveness takes the form:

$$\varepsilon = 1 - e^{-\frac{N_{tu}}{\tau}}. \qquad \text{EQ. B3}$$

Here, $\tau$ is a function of $C_{min}/C_{max}$. It will be recognized that, in general, $C_{max}$ is measured, $C_{min}$ is the controlled variable in system 100 (via control/manipulation of bypass valve 165) and $\tau$ comes from a look-up table—the values being determined experimentally.

APPENDIX C. Rearranging EQ. B1, yields:

$$\text{Water in Wet Stream Desired} = \frac{\text{Water Transferred into Dry Stream}}{\varepsilon}. \qquad \text{EQ. C1}$$

Rewriting EQ. C1 in terms of mass flow rates gives:

$$n'_{wet\text{-}in\ desired} = \frac{n'_{H_2O\text{-}desired}}{\varepsilon}, \text{ where} \qquad \text{EQ. C2}$$

$n'_{H_2O\text{-}desired}$ is given by EQ. A1, $\epsilon$ is given by EQ. B3 and $n'_{wet\text{-}in\ desired}$ represents the outcome of block 230.

APPENDIX D. Noting that the water transfer flow rate across WVTD 140 plus WVTD 140's water outlet flow rate equals the water input flow rate to WVTD 140, and if the molar fraction of water out of stack 105 is known (determined via one or more sensors and/or models), then the desired wet side inlet flow rate for WVTD 140 may be determined as follows:

$$n'_{wet\text{-}in\ desired} = \frac{n'_{H_2O\text{-}desired}}{[H_2O]_{cathode\text{-}out}}, \text{ where} \qquad \text{EQ. D1}$$

$[H_2O]_{cathode\text{-}out}$ represents the molar fraction of water out of stack 105's cathode.

Recognizing that, to achieve the desired cathode inlet RH, WVTD 140's cathode outlet flow rate $n'_{cathode\text{-}out}$ (via line 150) is equal to the desired flow rate into WVTD 140 $n'_{wet\text{-}in\ desired}$ (via line 155) plus the flow rate through bypass valve 165 $n'_{bypass}$, yields:

$$n'_{bypass} = n'_{cathode\ out} - n'_{wet\text{-}in\ desired}, \qquad \text{EQ. D2}$$

APPENDIX E. From Darcy's equation, we find:

$$F_{bypass\text{-}desired} = \qquad \text{EQ. E1}$$
$$1360 \times F_p \times C_{bypass} \times P_{bypass\text{-}in} \times Y \times \sqrt{\frac{x}{S_g \times T_{bypass\text{-}in} \times Z}}.$$

Here: $F_{bypass\text{-}desired}$ represents the desired flow rate through bypass valve 165 in cubic feet per hour; $F_p$ represents the piping factor of system 100 and, in particular, for the lines into and out of bypass valve 165; $C_{bypass}$ represents the bypass valve's flow coefficient in gallons of water per minute at 60° F. and 1 pound per square inch differential (psid); $P_{bypass-in}$ represents the inlet or upstream pressure at bypass valve 165 in pounds per square inch absolute (psia); Y represents the expansion factor of the relevant gasses (i.e., $O_2$, $N_2$ and $H_2O$); x represents the pressure drop ratio across bypass valve 165 (see below); $S_g$ represents the specific gravity of the gas through bypass valve 165; $T_{bypass-in}$ represents the temperature at bypass valve 165's inlet in degrees R; and Z represents the compressibility factor of the gasses through bypass valve 165.

Where bypass valve inlet and outlet piping is properly sized, piping factor $F_p$ is approximately 1. As used herein, "properly sized" means that the pressure drop across the pipe is much less than the pressure drop across bypass valve 165. Similarly, for the pressures and temperatures relevant to a gaseous hydrogen and air fuel cell system (e.g., approximately atmosphere to 350 KPa and −40° F. to 95° F.), compressibility factor Z is approximately equal to 1.

Expansion factor Y is given by:

$$Y = 1 - \frac{x}{3 \times F_k \times x_t}, \text{ where} \qquad \text{EQ. E2}$$

$F_k$ represents the ratio of specific heat factor for the relevant gases (i.e., $O_2$, $N_2$ and $H_2O$) and $x_t$ is the pressure drop ratio across bypass valve 165. The value of $x_t$ is specific to a valve's geometry and may be determined empirically. In turn, $$F_k = \frac{k}{1.4}, \text{ where} \qquad \text{EQ. E3}$$

k represents the ratio of specific heats for $O_2$, $N_2$ and $H_2O$.

For the pressures relevant to a gaseous hydrogen and air fuel cell system, k is approximately equal to 1.39 and, as a result, $F_k$ is approximately equal to 1.

Pressure drop ratio x is given by:

$$x = \frac{P_{bypass-in} - P_{bypass-out}}{P_{bypass-in}}, \text{ where} \qquad \text{EQ. E4}$$

$P_{bypass-out}$ represents the outlet or downstream pressure at bypass valve 165 in psia.

As used herein, the specific gravity of a gas is equal to the molecular weight of the gas divided by the molecular weight of air, where the molecular weight of the gas is the weighted sum of the molecular weights of the gasses constituent gasses. Accordingly, the specific gravity of cathode effluent (and, therefore, bypass valve inflow), $S_g$ is:

$$S_g = \frac{(mf_{H_2} \times mw_{H_2}) + (mf_{H_2O} \times mw_{H_2O}) + (mf_{N_2} \times mw_{N_2}) + (mf_{O_2} \times mw_{O_2})}{(mf_{H_2O} \times mw_{H_2O})_{air} + (mf_{N_2} \times mw_{N_2})_{air} + (mf_{O_2} \times mw_{O_2})_{air}}, \qquad \text{EQ. E5}$$

where $mf_x$ represents the molar fraction of x in the target gas, $mw_x$ represents the molecular weight of x and $(z)_{air}$ represents the z of air. For the pressures and temperatures relative to fuel cell system 100 (see above), $S_g$ is approximately 1. In one embodiment, $S_g$ is constantly estimated by controller 170 and is usually between 0.9 and 1.0 for the type of fuel cell system described herein.

EQ. E1 (and its supporting equations E2 through E5) constitute one model of bypass valve 165.

APPENDIX F. Rearranging EQ. E1 for $C_{bypass}$ (bypass valve bias value) yields:

$$C_{bypass} = \frac{F_{bypass-desired}}{1360 \times F_p \times P_{bypass-in} \times Y \times \sqrt{\frac{x}{S_g \times T_{bypass-in} \times Z}}}. \qquad \text{EQ. F1}$$

Substituting in the approximations relevant to fuel cell system 100 that are identified in APPENDIX E, yields:

$$C_{bypass} \approx \frac{F_{bypass-desired}}{1360 \times P_{bypass-in} \times Y \times \sqrt{\frac{x}{T_{bypass-in}}}} \qquad \text{EQ. F2}$$

$$= \frac{F_{bypass-desired}}{1360 \times P_{bypass-in} \times \left(1 - \frac{x}{3x_t}\right) \times \sqrt{\frac{x}{T_{bypass-in}}}}.$$

For completeness, it is noted that in the case where $x > F_k x_t$ (see APPENDIX E), $F_k x_t$ may be replaced by x in each of the following two situations: for $x \leq F_k x_t$—

$$C_{bypass} = \frac{F_{bypass-in} \sqrt{S_g \times T_{bypass-in}}}{1360 \times P_{bypass-in} \times Y \sqrt{x}}; \text{ and} \qquad \text{EQ. F3}$$

for $x > F_k x_t$ —

$$C_{bypass} = \frac{3 \times F_{bypass-in} \sqrt{S_g \times T_{bypass-in}}}{2720 \times P_{bypass-in} \sqrt{x}}. \qquad \text{EQ. F4}$$

In EQ. F2: $P_{bypass-in}$, x, $T_{bypass-in}$ and $S_g$ are measured quantities (or directly determined from measured quantities; $x_t$ is fixed for a given bypass valve position; and $F_{bypass-desired}$ is determined in accordance with EQ. D2.

As noted in APPENDIX B, $C_{max}$ is measured, $C_{min}$ is the controlled variable in system 100 (via control/manipulation of bypass valve 165) and τ comes from a look-up table—the values being determined experimentally.

The invention claimed is:
1. A fuel cell system, comprising:
a fuel cell stack having a cathode inlet and a cathode outlet;
a water vapor transfer device having a wet-inlet port and a dry-outlet port, the wet-inlet port in fluid communication with the cathode outlet, the dry-outlet port in fluid communication with the cathode inlet;
a valve having an upstream inlet and a downstream outlet, the upstream inlet in fluid communication with, and interposed between, the cathode outlet and the wet-inlet port, the valve configured to selectively shunt a fluid leaving the fuel cell stack via the cathode outlet from entering the wet-inlet port; and a controller configured to —
receive a target value for an operational characteristic of a fluid entering the cathode inlet,
receive a measured value for a fluid entering the cathode inlet, and
manipulate the valve in accordance with a model of the valve so that the measured value of the operational characteristic is substantially equal to the target value of the operational characteristic.

2. The fuel cell system of claim 1, wherein the fuel cell stack is configured to use gaseous hydrogen as a fuel.

3. The fuel cell system of claim 1, wherein the water vapor transfer device further includes a dry-inlet port, the water vapor transfer device configured to transfer water from a fluid entering the wet-inlet port to a fluid entering the dry-inlet port and route same to the dry-outlet port.

4. The fuel cell system of claim 3, wherein the dry-inlet port is in fluid communication with a source of gaseous oxidant.

5. The fuel cell system of claim 4, wherein the gaseous oxidant comprises a gaseous supply of oxygen.

6. The fuel cell system of claim 5, wherein the gaseous supply of oxygen comprises air.

7. The fuel cell system of claim 1, wherein the controller comprises a proportional-integral-derivative controller.

8. The fuel cell system of claim 7, wherein the proportional-integral-derivative controller comprises a discrete proportional-integral-derivative controller.

9. The fuel cell system of claim 1, wherein the operational characteristic comprises relative humidity.

10. The fuel cell system of claim 1, wherein the operational characteristic comprises dew point.

11. The fuel cell system of claim 1, wherein the operational characteristic comprises a fuel cell stack membrane conductivity.

12. The fuel cell system of claim 1, wherein the operational characteristic comprises a NULL characteristic so that the controller is configured to operate in an open-loop mode.

13. A method for operating a fuel cell system having a fuel cell stack and a water vapor transfer device, the fuel cell stack having a cathode inlet and a cathode outlet, the water vapor transfer device configured to transfer water from a fluid received from the cathode outlet to a fluid destined for the cathode inlet, the method comprising:
obtaining a target value of an operational parameter for a fluid entering the cathode inlet;
obtaining a measured value for the operational parameter for the fluid entering the cathode inlet; and
manipulating a bypass valve in accordance with a model of the bypass valve so that fluid leaving the fuel cell stack through the cathode outlet is controllably shunted around the water vapor transfer device, wherein the act of manipulating is performed so that the measured value of the operational parameter is substantially equal to the target value of the operational parameter.

14. The method of claim 13, wherein the operational parameter comprises relative humidity.

15. The method of claim 13, wherein the operational parameter comprises dew point.

16. The method of claim 13, wherein the operational parameter comprises a membrane conductivity of the fuel cell stack.

17. The method of claim 13, wherein the operational parameter comprises a NULL parameter so that the controller is configured to operate in an open-loop mode.

18. A fuel cell system operating method, comprising:
receiving, for a fluid entering a cathode inlet of a fuel cell system, a target value for a specified operational parameter;
receiving, for the fluid entering the cathode inlet of the fuel cell system, a measured value of the specified operational parameter;
determining a desired water vapor transfer device (WVTD) water transfer flow rate;
determining a desired WVTD bypass flow rate;
determining a bypass valve position based on the desired WVTD water transfer flow rate, desired WVTD bypass flow rate, a bypass valve model and the measured value of the operational parameter; and
using the determined bypass valve position to manipulate a bypass valve to shunt a fluid leaving a cathode outlet of the fuel cell system from entering the WVTD so that the measured value of the operational parameter is substantially equal to the target value of the operational parameter.

19. The method of claim 18, wherein the operational parameter comprises relative humidity.

20. The method of claim 18, wherein the operational parameter comprises dew point.

21. The method of claim 18, wherein the operational parameter comprises a membrane conductivity of the fuel cell stack.

* * * * *